US010015254B1

(12) United States Patent
Tsao

(10) Patent No.: US 10,015,254 B1
(45) Date of Patent: *Jul. 3, 2018

(54) SYSTEM AND METHOD FOR WIRELESS DEVICE ACCESS TO EXTERNAL STORAGE

(71) Applicant: Sheng Tai (Ted) Tsao, Fremont, CA (US)

(72) Inventor: Sheng Tai (Ted) Tsao, Fremont, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,509

(22) Filed: Dec. 21, 2015

Related U.S. Application Data

(63) Continuation of application No. 14/036,744, filed on Sep. 25, 2013, now Pat. No. 9,239,686, which is a continuation of application No. 10/726,897, filed on Dec. 4, 2003, now Pat. No. 8,606,880.

(51) Int. Cl.
G06F 3/00 (2006.01)
H04L 29/08 (2006.01)
G06F 3/06 (2006.01)
H04M 1/725 (2006.01)

(52) U.S. Cl.
CPC ........ H04L 67/1097 (2013.01); G06F 3/0604 (2013.01); G06F 3/067 (2013.01); G06F 3/0643 (2013.01); H04L 67/06 (2013.01); H04M 1/72522 (2013.01)

(58) Field of Classification Search
CPC ............ H04L 67/1097; H04L 67/06; H04M 1/72522; G06F 3/0604; G06F 3/0643; G06F 3/067

USPC .......... 711/118, 154, 171; 709/219, 226; 710/36; 712/225, 245

See application file for complete search history.

(56) References Cited

U.S. PATENT DOCUMENTS

| | | | | |
|---|---|---|---|---|
| 6,292,833 B1* | 9/2001 | Liao | ............. | H04W 12/08 709/219 |
| 6,351,776 B1* | 2/2002 | O'Brien | ............. | G06F 17/30067 707/999.001 |
| 6,356,838 B1* | 3/2002 | Paul | ............. | G01C 21/3453 701/410 |
| 6,754,710 B1* | 6/2004 | McAlear | ............. | G08C 17/00 709/208 |
| 6,757,898 B1* | 6/2004 | Ilsen | ............. | G06F 19/324 600/300 |
| 7,379,990 B2* | 5/2008 | Tsao | ............. | H04L 41/12 709/220 |
| 7,418,702 B2* | 8/2008 | Tsao | ............. | G06F 9/526 709/229 |

(Continued)

Primary Examiner — Reba I Elmore

(57) ABSTRACT

Traditionally, wireless device, such as cell phone or personal data assistant device (PDA), has relatively smaller storage capacity. Therefore, it is quite often that a user of the wireless device has difficulty to find more storage space for storing ever increased personal data, such as storing message, and multiple Gig bytes of multimedia data including digital video, music, or photo picture etc. Instant application disclosed a system and method for a storage system providing storage service to the wireless device for the wireless device remotely storing personal data into an external storage space allocated exclusively to a user of the wireless device by the storage system.

20 Claims, 4 Drawing Sheets

(56) References Cited

U.S. PATENT DOCUMENTS

| | | | | |
|---|---|---|---|---|
| 8,606,880 B2* | 12/2013 | Tsao | ............... | G06F 17/30067 |
| | | | | 455/412.1 |
| 9,098,526 B1* | 8/2015 | Tsao | ............... | G06F 17/30067 |
| 9,219,780 B1* | 12/2015 | Tsao | ............... | G06F 17/30067 |
| 9,239,686 B2* | 1/2016 | Tsao | ............... | G06F 3/0631 |
| 2002/0004855 A1* | 1/2002 | Cox | ............... | G06Q 30/02 |
| | | | | 719/328 |
| 2003/0018887 A1* | 1/2003 | Fishman | ............... | H04L 29/06 |
| | | | | 713/151 |
| 2003/0046586 A1* | 3/2003 | Bheemarasetti | .... | H04L 63/0272 |
| | | | | 726/15 |
| 2003/0078986 A1* | 4/2003 | Ayres | ............... | H04L 29/06 |
| | | | | 709/217 |
| 2003/0194998 A1* | 10/2003 | Bhide | ............... | H04W 4/18 |
| | | | | 455/433 |
| 2003/0233329 A1* | 12/2003 | Laraki | ............... | G06Q 20/123 |
| | | | | 705/52 |
| 2004/0162876 A1* | 8/2004 | Kohavi | ............... | G06F 17/30943 |
| | | | | 709/203 |
| 2004/0192342 A1* | 9/2004 | Ranganathan | ...... | H04L 65/4092 |
| | | | | 455/456.1 |
| 2005/0010648 A1* | 1/2005 | Ramaswamy | ...... | H04L 12/5692 |
| | | | | 709/217 |
| 2005/0071418 A1* | 3/2005 | Kjellberg | ............ | G06Q 20/123 |
| | | | | 709/200 |
| 2005/0091184 A1* | 4/2005 | Seshadri | ............... | G06F 9/4443 |
| 2007/0089110 A1* | 4/2007 | Li | ............... | H04L 67/2847 |
| | | | | 717/178 |
| 2008/0235360 A1* | 9/2008 | Li | ............... | G06F 17/30902 |
| | | | | 709/223 |

* cited by examiner

Wireless devices supports in a simple environment

SYSTEM AND METHOD FOR WIRELESS DEVICE ACCESS TO EXTERNAL STORAGE

CROSS REFERENCE TO PRIOR APPLICATION

This invention is a continuation application of the U.S. patent application Ser. No. 14/036,744 filed on Sep. 25, 2013, now a U.S. Pat. No. 9,239,686 and which itself is continuation application for U.S. patent application Ser. No. 10/726,897 filed on Dec. 4, 2003 and now a U.S. Pat. No. 8,606,880. The application Ser. No. 10/726,897 has also referenced application Ser. No. 10/713,904 of "Concurrent Web Based Multi-task Support for Control Management System" and application Ser. No. 10/713,905 of "IP Based Distributed Virtual SAN" in the name of same inventor. All mentioned prior applications and patents are herein incorporated by reference in their entirety for all purpose.

FIELD OF THE INVENTION

This invention relates to wireless devices accessing and using external storage spaces provided by one or more servers.

BACKGROUND INFORMATION

Storage system can be categorized as internal storage or external storage system.

The internal storages of a computing system include those storage media such as hard disk drives, memory sticks, memory, and others that are internally connected within the computing system through system bus or a few inches of cable. Therefore, the storage media actually are internal components of the computing system in a same enclosure.

The external storages of a computing system are those storage media that are not the internal components of the computing system in a same enclosure. Therefore, they have to be connected through longer cable, such as through Ethernet cable for IP based storage, Fiber channel cable for fiber channel storage, or wireless communication media, and others. The storage media of the external storage could be magnetic hard disk drives, solid state disk, optical storage drives, memory card and others, and could be in any form such as Raid which usually consists of a group of hard disk drives.

To effectively use a storage system, the storage devices of the storage system usually need to be partitioned into small volumes. After the partitioning, each of the volumes can be used for establishing a file system on top of it. To simplify the discussion, herein, the term of the storage volume and its corresponding file system, and the term of the storage partition are often used without differentiation in this invention.

CCDSVM in this invention is an abbreviation for a central controlled distributed scalable virtual machine. The CCDSVM allows a control management system to control a group of computing systems for providing distributed services to client systems over the Internet, Intranet, and LAN environment.

By the way, in this invention, the ISP refers to Internet service provider and the ASP refers to application service provider.

Figure 1:
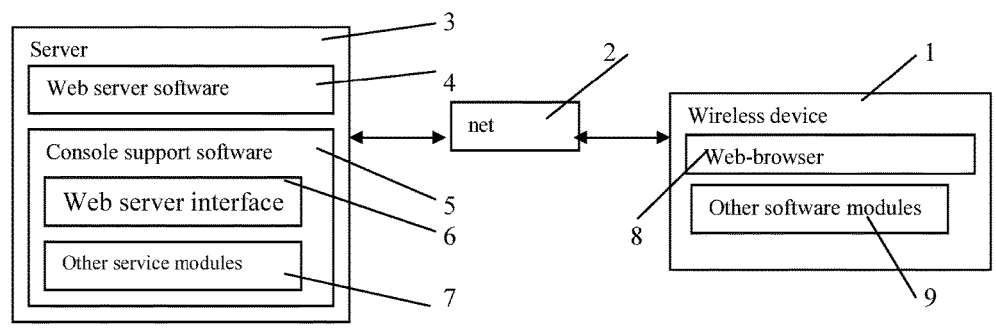
FIG. 1 is a figure the same as a FIG. 1 of a prior application Ser. No. 10/713,904 of the "Concurrent Web Based Multi-task Support for Control Management System" with exceptions that a console host of the prior application being replaced herein by a wireless device.

Unless specified, the programming languages and the protocols used by the software modules, and the computing systems used in this invention are assumed to be the same as described in the prior patent applications.

In addition, in the drawing, like elements are designated by like reference numbers. Further, when a list of identical elements is present, only one element may be given the reference number.

BRIEF DESCRIPTION OF THE INVENTION

Today, users commonly face a problem of lack of storage capacity in their wireless devices such as in their cell phones or personal data assistant devices ("PDA"), which are usually limited to 256 MB for the PDA and much less for the cell phone. To effectively solve this problem and let users possess multiple gigabytes (GB) of storage for their wireless devices as well as allowing the users to use the GB storage for their multimedia applications, the storage on a server can be used as the external storage for the wireless devices. This technology has been briefly introduced in the prior patent applications by the same author.

Figure 2:
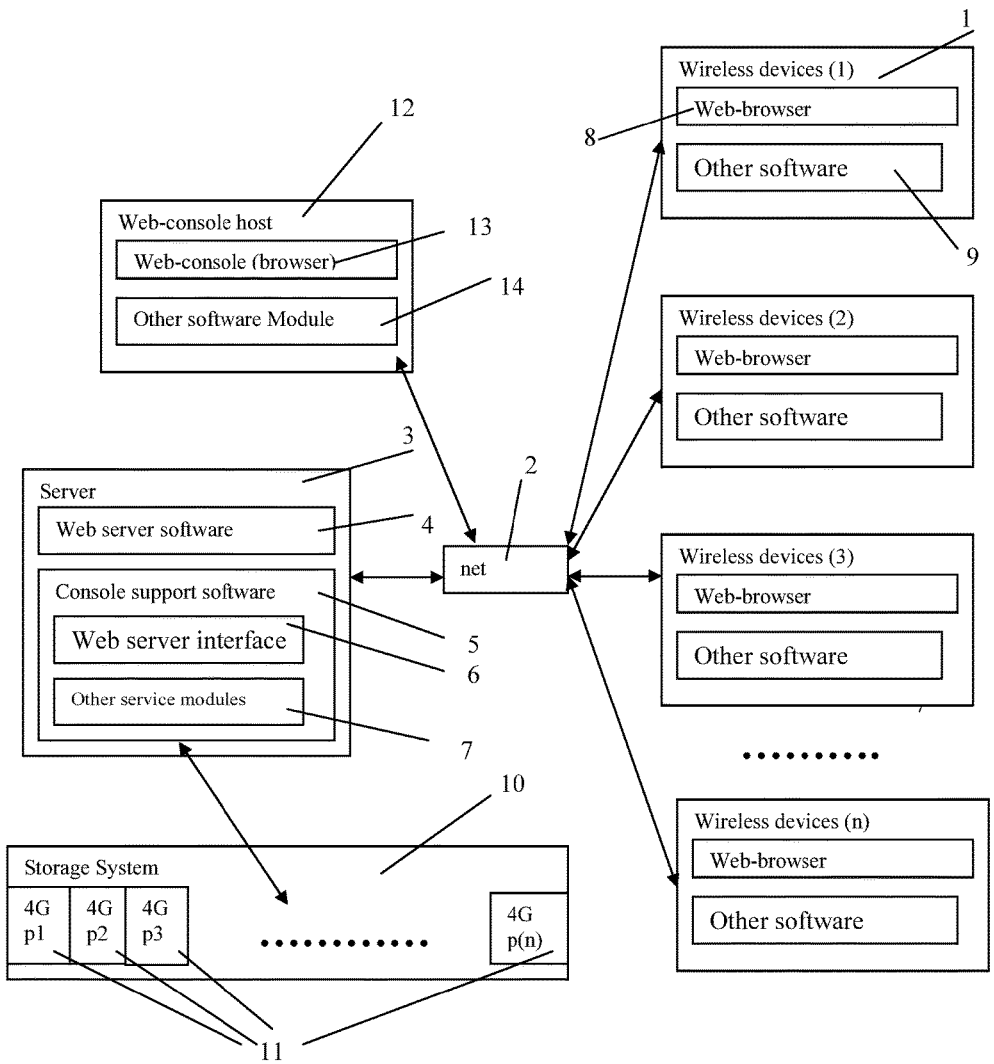
FIG. 2 is a figure the same as the FIG. 1 of this invention with an exception that it shows a more detailed storage system configured and controlled by the server in the FIG. 1 above. In addition, multiple wireless devices are presented in this FIG. 2.
Figure 3:
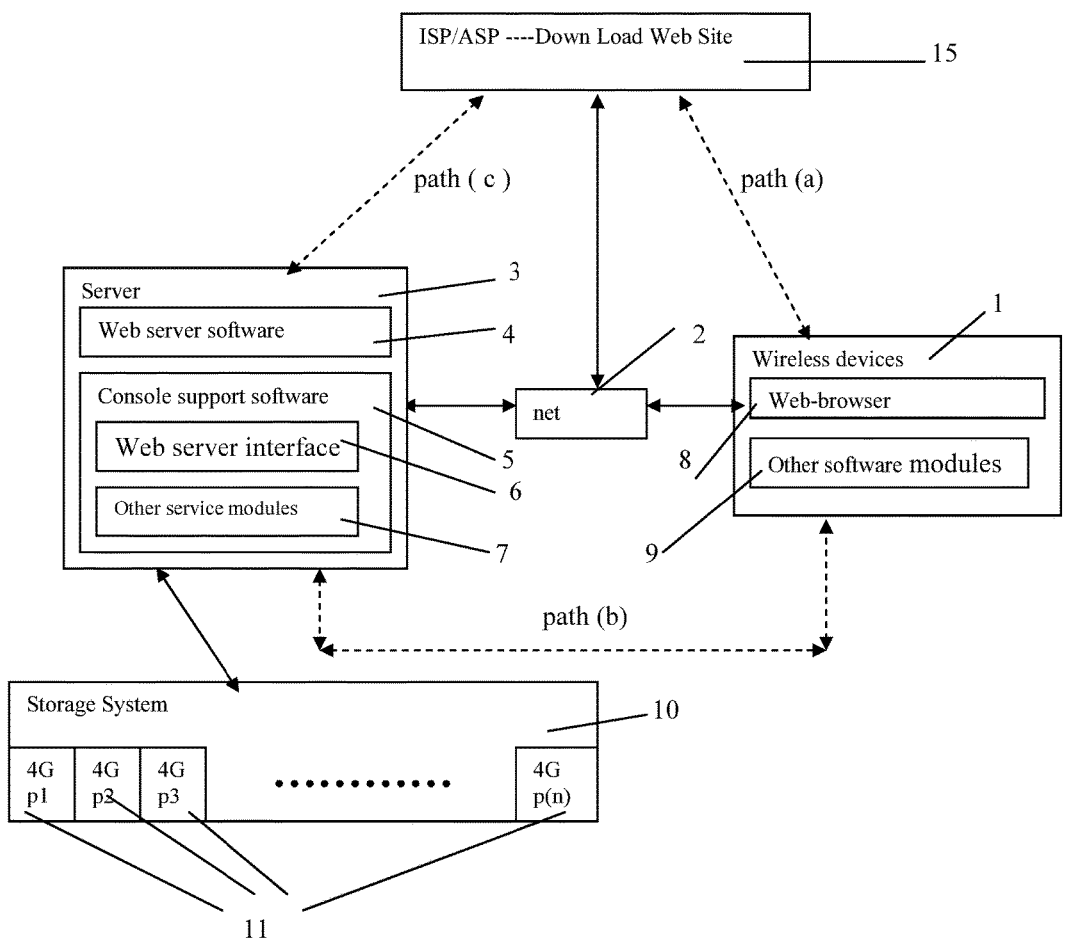
FIG. 3 shows a scheme of a wireless device downloading data (contents) from an ISP/ASP or from other web sites to an external storage of the wireless device.

The followings describe details on how can the external storage actually be used by the wireless devices by referring to the FIG. 2. First, let each server unit (e.g. the server 3 of the FIG. 2) partition its storage system in such way that each of volumes will have multiple GB in size. Therefore, a user of any one of the wireless devices can exclusively be assigned for access to a specific storage volume on the server unit 3. For example, if we need to provide each user a 4 GB storage space, then a 160 GB disk drive can support 40 users. Therefore, a 4096 GB storage system on the server unit 3 can support a total of 1024 users. Further, any data on the wireless device can be transmitted to the assigned storage volume on the server unit. In addition, the user on the wireless device also can download multimedia data from an ISP or ASP to the assigned storage volume of the designated server unit 3 through out-band approach as shown in FIG. 3. Finally, the user can use a web-browser, which has a functionality of invoking embedded video or music, to enjoy his/her stored multimedia contents.

These and other features, aspects and advantages of the present invention will become understood with reference to the following description, appended claims, and accompanying figures.

DETAILED DESCRIPTION OF THE DRAWINGS

Referring now to the FIG. 1, this figure demonstrates a network connection between a wireless device and a server, where Net (2) represents a communication link, which may be combined with wireless and wired connection media and guarantee that the communication packets can be sent or received between the wireless device and the server. It is also assumed that the net (2) infrastructure is built up in such way that a user from a web-browser of a wireless device can access and browse any web-site on the Internet, and Intranet.

In the FIG. 1, the console support software (5) on the server (3) can support web-based multitasking while a user using a web-browser (8) of a wireless device (1). Further, the user on the web-browser (8) is facilitated to perform creating structured layered file directories or folders, and perform data management operations, such as delete, move, copy, rename for data files or folders or directories residing on an assigned storage volume of the server (3).

In addition, the other software modules (9) of the wireless device (1) is also configured capable to send data to or receive data from the other service modules (7) of the server (3) via communication link (2) through a suitable IP or non-IP based protocol. The data being sent or received could be a digital photo picture, a message and other data.

In addition, the console supporting software (5) of the server (3) and the other software modules (9) of the wireless device (1) can be implemented with suitable languages such as C, C++, Java, and others.

Besides, the web-browser (8) of the wireless device (1) can be any suitable software tool, which. is capable to communication with web server software (4) on the server (3) or with other web server through the HTTP protocol.

The FIG. 2 has demonstrated how can the storages of a server (3) be assigned to multiple wireless devices for being used as their external storage as follows:

First, the storage system (10) of the server (3) can be partitioned into multiple volumes (11), for example, by administration staff through a web-console (13) of a console host (12).

Second, the storage system (10) of the server (3) can be partitioned in such way that each of the wireless devices can be assigned with a storage volume of a desired size, which can be best supported by the server (3) for supporting maximum numbers of the wireless devices.

In addition, the storage connection media could be any kind such as SCSI cable, IP cable, Fiber cable and others. Meanwhile, the storage system itself could be various types.

Finally, the storage system (10) can be accessed by each of the wireless devices through IP or non-IP based network and protocols.

The FIG. 3 has demonstrated that a user from a web-browser (8) on a wireless device (1) can download data from a known web-site (15) to his/her assigned external storage (10) on the server (3). The dash-lined path (a) represents a communication link between the wireless device (1) and the remote web-site (15), which provides contents for web download. The dash-lined path (b) represents a communication link between the wireless devices (1) and the storage server (3). The dash-lined path (c) represents a communication link between the server 3 and the remote web-server (15), which provides download contents.

THE DETAILED DESCRIPTION OF THE INVENTION

The Use of the External Storage of the Wireless Device:

The FIG. 2 shows a simplified diagram illustrating the wireless devices (1) using and accessing the external storage system (10) of a server (3) for solving the storage limitation problem of the wireless devices (1).

Partition Storage Volumes (Refer to the FIG. 2):

With this invention, the entire storage (10) on a server (3) needs to be partitioned into suitable size of volumes (11) such as 4 GB for each volume for allowing the server 3 to serve maximum number of the wireless devices (1). With the web console support software (5) of the server (3), the task of partitioning the storage system (10) can be done through a web-console (13) on a console host (12) by an administrative staff.

In order to support storage partition, first the console support software (5) of the server (3) must send storage information of the server (3) to the web-console (13) of the console host (12). The storage information includes each storage device name, storage size and others. Second, based on the storage information received, the administration staff on the console host (12) can use the web-console (13) to fill (partition each storage device) and send the storage partition information to the console support software (5) of the server (3). The storage partition information includes the number of the partitions (volumes) and the size of each partition (volume). Third, upon receiving the storage partition information from the web-console (13) of the console host (12), the console support software (5) of the server (3) performs the actual storage partition by dividing the entire storage into multiple small volumes. Finally, for each small storage volume, a corresponding file system could be built up.

Assign Storage Volumes (Refer to the FIG. 2):

Each of the storage volumes (11) together with its corresponding file system (11) on the storage system (10) of the server (3) needs to be exclusively assigned and exported to a given specific wireless device (1) by the console support software (5) of the server (3).

Data and Storage Volume Management (Refer to FIG. 2)

With the support of the console support software modules (5) of the server system-(3), a user on a web-browser (8) of the wireless device (1) can setup folder or directory structure on the file system of his/her assigned external storage volume (11). In addition, the user on the web-browser (8) of the wireless device (1) can performing all data management operations such as delete, copy, move, or rename and other operations for files or folders on that file system.

In order to support such data management over the external storage (10) by using the web-browser (8) of the wireless device (1), first the console support software modules (5) of the server system (3) must communicate with the web-browser (8) of the wireless device (1) for presenting the external storage to a user on a user device. Therefore, the user from the web-browser (8) of the wireless device (1) can choose and submit desired data management operation for the wireless device (1) sending the operation information to the console support software modules (5) of the server system (3). These operations include establishing folder or directory, and copying, moving, or renaming data file and others for the folder or directory. Second, upon receiving each data management operation, the console support software modules (5) of the server system (3) actually performs the operation over the assigned file system of the assigned external storage volume (11) on the server system (3).

Store Data from Wireless Device into External Storage (Refer to FIG. 2):

To store the data such as digital photo pictures or messages into the assigned file system on the external storage (11) of a server (3), the other software modules (9) of the wireless device (1) need to send the data to the other service modules (7) of the server (3) via communication link between them. Upon receiving the data, the other service modules (7) of the server (3) write these data to the assigned file system of the assigned storage volume (11) on the server (3). The protocol used between these two communication entities could be either IP or non-IP based protocol.

Download Data from a Remote Web Server Site into External Storage (Refer to the FIG. 3):

If a user of a wireless device (1) wants to download data from a remote web server (15) into an assigned file system (11) of the assigned external storage on a server (3), the following steps are required:

1) Provide the user from a web-browser (8) of the wireless device (1) access to a remote web server site (15) to obtain information for the downloading via the path (a) of the FIG. 3. For example, to provide the user via the web browser obtains a web-page, which contains IP address of the remote web site and the data name for the downloading.

2) The other software modules (9) of the wireless device (1) obtain the downloading information, which becomes available in the cached web-pages on the wireless device (1) after the web-browser (8) accessing the web site (15).

3) The other software modules (9) of the wireless device (1) send the obtained downloading information to other service modules (7) of the storage server (3) via the path (b).

4) Upon receiving the downloading information from the wireless device (1), the other service module (7) of the storage server (3) sends a web download request to the web-site (15) via the path (c) based on download information obtained and then receives the downloading data from the web server of the web-site (15).

5) Upon receiving downloading data, the other service modules (7) of the storage server (3) write the data for the wireless device (1) into the assigned file system (11) on the server (3).

Retrieve Data from External Storage of a Wireless Device:

1) If a web browser (8) has embedded video or music functionality, the web-browser (8) of a wireless device (1) can be used to retrieve and play multimedia data file such as video or music stored in the wireless device's external storage volume (11), which actually located on a server (3).

2) If there is needs, the other software module (9) of the wireless device (1) also can retrieve data file from the assigned file system of the assigned storage volume (11) on a server (3).

Figure 4:
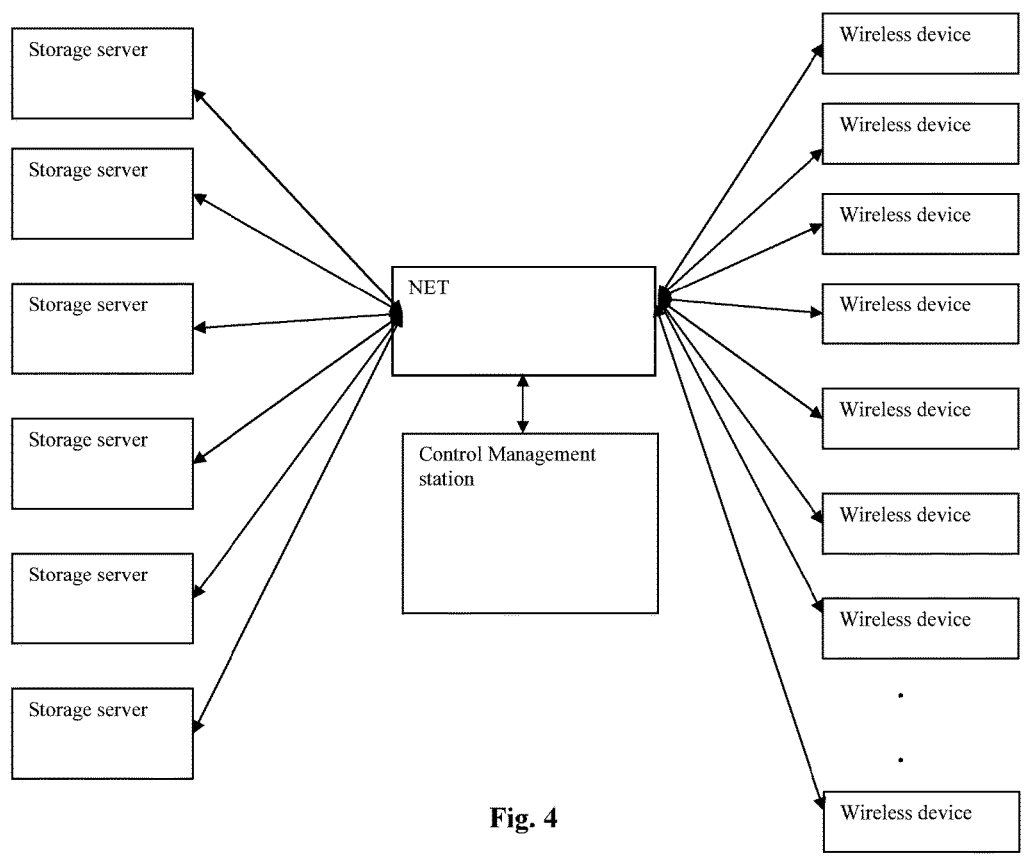
FIG. 4 is a figure the same as a FIG. 1 of the prior application Ser. No. 10/713,905 of "IP Based Distributed Virtual SAN" with an exception that each IP storage server herein provides file system for external storage to each of the wireless devices instead of providing IP based virtual SAN service of the prior application. Also, each host in the FIG. 1 of the prior application has been replaced by a wireless device of this invention.

Support External Storage for Large Number of the Wireless Devices:

Referring now to the FIG. 4. If there is a need to provide each user a 2 GB of storage space, then a 160 GB disk drive can support 80 users. A 4096 GB (4 Tera Bytes) storage system on the server unit can support 2024 user. Therefore, a server unit 3 only can efficiently support a limited size of the storage system. In order to support a large number of the wireless devices, such as for supporting 500,000 wireless devices, a larger number of the servers is required, in this case 250 servers is required. In order to let a larger number of the servers to effectively support the larger number of the wireless devices, an infrastructure like the CCDSVM is desirable, which has been described in the prior patent applications. With the CCDSVM the control management system can control larger number of storage servers to provide external storage for a huge number of the wireless devices.

What is claimed is:

1. A wireless device accessing a remote storage space, the wireless device comprising:
at least one cache storage for caching data received from the Internet, and
one computer-readable storage device comprising program instructions which, when executed by the wireless device, configure the wireless device accessing the remote storage space, wherein the program instructions comprise:
program instructions for the wireless device establishing a communication link for accessing the remote storage space served by a first server;
program instructions for the wireless device displaying the remote storage space upon receiving information of the remote storage space from the first server; and
program instructions for the wireless device coupling with the first server to carry out a requested operation for accessing the remote storage space in response to a user, through the remote storage space displayed on the wireless device, performing the operation,
wherein the operation being carried out for accessing the remote storage space comprises from the wireless device storing data therein or retrieving data therefrom, the storing data comprising to download a file from a second server across a network into the remote storage space through utilizing information for the file cached in the cache storage in the wireless device.

2. The wireless device of claim 1, wherein said downloading a file from a second server comprises:
program instructions for the wireless device obtaining the information for the file from the second server, and
transmitting the information for the file cached in the wireless device to the first server to cause the first server, in accordance with the information for the file, to download the file from the second server into the remote storage space.

3. The wireless device of claim 1, wherein said information for the file cached in the wireless device comprises at least the name of the file and the internet protocol ("IP") address of the second server.

4. The wireless device of claim 3, wherein said displaying the remote storage space further comprises program instruction for the wireless device displaying information of the remote storage space in a web browser on the wireless device for accessing the remote storage space or accessing the Internet.

5. The wireless device of claim 1, wherein the wireless device is one of a cell phone, or a personal data assistant and management device ("PDA").

6. The wireless device of claim 1, wherein said operation for accessing the remote storage space comprises:
from the wireless device and via a wireless link creating a folder, or a layered folder or directory structure in the remote storage space.

7. The wireless device of claim 6, wherein said operation for access the remote storage space comprises:
from the wireless device moving, copying, deleting or renaming a data object in respect to the layered folder or directory structure, wherein said data object is a file or folder.

8. The wireless device of claim 1, wherein said operation for accessing the remote storage space comprises: from the wireless device and via a wireless link storing therein or retrieving therefrom a data object of a message, or a digital video, music, or picture file.

9. A server for delivering storage service, comprising:
a plurality of storage spaces residing among a plurality of storage devices; and
a computer-readable storage device comprising program instructions that, when executed by the server, configure the server to control delivering the storage service; wherein the program instructions comprise:

program instructions for the server establishing a communication link for a first wireless device remotely accessing a first one of the storage spaces;

program instructions for the server sending information of the first one of the storage spaces to the first wireless device for causing display of the information on the first wireless device; and program instructions for the server updating the first one of the storage spaces according to a requested operation received from the first wireless device upon a user thereof, through the displayed information of the first one of the storage spaces performing the operation for remotely accessing the first one of the storage spaces, wherein said operation for remotely accessing the first one of the storage spaces comprises from the first wireless device storing data therein or retrieving data therefrom, wherein the storing data further comprises program instructions for the server downloading a file from a remote server across a network into the first one of the storage spaces through utilizing information for the file cached in a cache storage in the first wireless device.

10. The server of claim 9, wherein said downloading a file through utilizing information for the file cached in the first wireless device comprises program instructions for the server receiving the information for the file from the first wireless device, and sending a request of downloading the file to the remote server according to the information for the file received.

11. The server of claim 9, wherein the server presents a second one of the storage spaces to a user on a second wireless device for facilitating the user to perform operations for remotely accessing the second one of the storage spaces.

12. The server of claim 9, wherein said causing display of the first one of the storage spaces further comprises: causing display of the first one of the storage spaces in a web browser on the first wireless device for accessing the first one of the storage spaces.

13. The server of claim 9, wherein said program instructions configuring the server to control delivering the storage service comprise program instructions for the server to send information of said plurality of storage devices to a web console for partition each of said storage devices for creating the storage spaces.

14. The server of claim 9, wherein said operation further comprises: from the first wireless device remotely creating a folder or a layered folder or directory structure in the first one of the storage spaces, or remotely deleting, moving, copying or renaming a data object in respect to the layered folder structure, wherein the data object is a file, a folder, where the file includes digital picture, music or video file.

15. The server of claim 9, wherein said operation for accessing the first one of the storage spaces comprises: from the wireless device and via a wireless link storing therein or retrieving therefrom a data object of message, digital video, digital music, or digital picture.

16. A method for a wireless device accessing a remote storage space, the method comprising actions performed by the wireless device, including:

establishing a communication link for accessing the remote storage space served by a first server;

displaying the remote storage space on the wireless device upon receiving information of the remote storage space from the first server; and coupling with the first server to carry out a requested operation for accessing the remote storage space in response to a user, through the remote storage space displayed on the wireless device, performing the operation, wherein the operation being carried out for accessing the remote storage space comprises from the wireless device storing data therein or retrieving data therefrom, the storing data comprising to download a file from a second server across a network into the remote storage space through utilizing information for the file cached in a cache storage in the wireless device.

17. The method of claim 16, wherein said downloading a file from a second server comprises:

the wireless device obtaining the information for the file from the second server, transmitting the information for the file cached in the cache storage in the wireless device to the first server, and causing the first server in accordance with the received information for the file to download the file from the second server into the remote storage space.

18. The method of claim 16, wherein said wireless device displaying the remote storage space further comprises displaying the remote storage space in a web browser for accessing the remote storage space.

19. The method of claim 16, wherein said operation for accessing the remote storage space comprises:

from the wireless device and via a wireless link creating a folder, or a layered folder or director structure in the remote storage space.

20. The method of claim 19, wherein said operation for accessing the remote storage space comprises:

from the wireless device and via a wireless link moving, copying, deleting, or renaming a data object of file or folder in respect to the layered folder or director structure.

* * * * *